United States Patent

[11] 3,617,346

[72] Inventors Leon H. Chance
New Orleans;
George L. Drake, Jr., Metairie, both of La.
[21] Appl. No. 810,371
[22] Filed Mar. 25, 1969
[45] Patented Nov. 2, 1971
[73] Assignee The United States of America as represented by the Secretary of Agriculture

[54] AZIRIDINE ADDUCTS OF $\alpha,\beta$-UNSATURATED NITRILES AND POLYMERS THEREOF
1 Claim, No Drawings

[52] U.S. Cl.................................................. 117/56,
8/54.2, 8/100, 8/116.2, 117/139.5, 117/143, 260/2
EN, 260/78.4 N, 260/239 E
[51] Int. Cl........................................................B44d 1/092,
D06p 3/60

[50] Field of Search............................................8/54.2, 100,
116.2; 117/56, 139.5 CD, 139.5 A, 143 A, 143 R;
260/2 EN, 78.4 N, 239 E

[56] References Cited
UNITED STATES PATENTS
3,038,776 6/1962 Chance et al................. 8/116.2
3,127,732 4/1964 Brown et al.................. 8/116.2 X Primary Examiner—William D. Martin
Assistant Examiner—M. R. Lusignan
Attorneys—R. Hoffman and W. Bier ABSTRACT: This invention relates to a process for pretreating cellulosic fabrics with acid catalysts, and then impregnating said fabrics with aziridine adducts of $\alpha,\beta$-unsaturated nitriles.

AZIRIDINE ADDUCTS OF α,β-UNSATURATED NITRILES AND POLYMERS THEREOF

A nonexclusive, irrevocable, royalty-free license in the invention herein described, throughout the world for all purposes of the United States Government, with the power to grant sublicenses for such purposes, is hereby granted to the Government of the United States of America.

The compounds of the present invention are useful in polymerizing on cotton fabrics to improve their abrasion resistance and receptivity to acid dyes.

The aziridine adducts of α,β-unsaturated nitriles of the present invention may be prepared by bringing into reactive combination an α,β-unsaturated nitrile and aziridine. The reaction takes place over a temperature range, usually about from 60° C. to 80° C. The less reactive nitriles required a catalyst to promote the reaction. Liquid products are obtained which are purified by distillation.

Compounds related to the compounds of the present invention have been prepared by techniques known in the art, as shown by H. Bestian, Annalen der Chemie 566, 210 (1950), and Yoshida and Naito, J. Chem. Soc. Japan, Ind. Chem. Sect. 55, 455 (1952). The prior art, however, does not include the compounds of the present invention.

Typically illustrative of the α,β-unsaturated nitriles employed in the process of this invention are: crotonitrile, 2-methyleneglutaronitrile, cinnamonitrile, and methacrylonitrile. The reaction for the preparation of the compounds of this invention proceeds according to the following equation typified by crotononitrile:

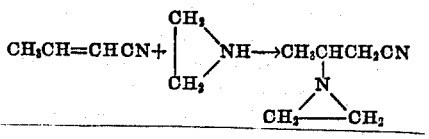

In general, the products prepared by the present invention are formed, as indicated above, by reacting at least one mole of aziridine with one mole of the nitrile. However, an excess of ethylenimine is desirable for obtaining the best yields. The amount of excess aziridine used is not important since it may be recovered unchanged upon completion of the reaction.

Reaction can be completed within from about 6 hours to 16 hours depending on the temperature and the nitrile utilized. The more reactive nitriles such as crotononitrile and 2-methylene glutaronitrile react slowly with aziridine at room temperature. After the reaction is completed the products are distilled.

Polymers in the form of white powders, brittle solids, or tacky solids can be formed from the compounds described herein. The polymerization may be carried out in aqueous solution, or in organic solvents such as ethanol or benzene. The polymerization is promoted by acid catalysts, which may be mineral acids such as hydrochloric, sulfuric or fluoboric acid, organic acids such as acetic acid, or latent acid catalysts such as zinc fluoborate, zinc nitrate, zinc chloride, zinc sulfate, zinc acetate, or magnesium chloride.

The polymers can be deposited on the surface and/or within cotton fiber or cotton fabric, thereby rendering the cotton more susceptible to acid dyes and in some cases more resistant to abrasion. The cotton fiber or fabric may be impregnated with an aqueous solution of the catalyst, dried to remove the water, and then impregnated with a solution of the aziridine adduct of the nitrile. The fabric may be dried at from about 25° C. to 100° C.

The following examples illustrate the details of the invention. The parts given are by weight.

EXAMPLE 1

Preparation of 3-(1-aziridinyl)butyronitrile. Aziridine (50 parts) was added dropwise with stirring to a flask containing crotononitrile (67 parts). The solution was heated at reflux for nine hours and the product distilled, yielding 53.7 parts of 3-(1-aziridinyl)butyronitrile, a colorless water soluble liquid, b.p. 194.5°–195.5° C./165 mm., $n_D 30°$ C./0.43979. Anal. calcd. for $C_6H_{10}N_2$: C, 65.41; H, 9.15; N, 25.43. Found: C, 65.37; H, 9.15; N, 25.44.

EXAMPLE 2

Preparation of 2-(1-aziridinylmethyl)glutaronitrile. Aziridine (30 parts) and 2-methylene glutaronitrile were mixed in a flask and heated on a water bath at 80° C. for 9.5 hours. The product was distilled, yielding 66 parts of 2-(1-aziridinylmethyl)glutaronitrile, a colorless water soluble liquid, b.p. 103°–104°C./0.07 mm. anal. calcd. for $C_8H_{11}N_3$: C, 64.41; H, 7.43; N, 28.17. Found: C, 64.60; H, 7.60; N, 28.04.

EXAMPLE 3

Preparation of 3-(1-aziridinyl)-3-phenylpropionitrile. Aziridine (21.5 parts), cinnamonitrile (53.4 parts) and metallic sodium (0.8 parts) were placed in a flask and heated with stirring on a water bath at 70° C. for 7 hours. The mixture turned black and was viscous. The product was distilled, yielding 29.8 parts of 3-(1-aziridinyl)-3-phenyl-propionitrile, a colorless water insoluble oil, b.p. 91°/0.03 mm. Anal. calcd. for $C_{11}H_{12}N_2$: C, 76.71; H, 7.02; N, 16.27; mol wgt., 172.2. Found: C, 76.88; H, 6.99; N, 16.34; mol wgt., 170.

EXAMPLE 4

Preparation of 3-(1-aziridinyl)-2-methylpropionitrile. Aziridine (53 parts), methacrylonitrile (67.1 parts) and metallic sodium (0.5 parts) were placed in a flask and heated in a water bath at 60° C. for about 16 hours. After the first hour of heating about 8 parts of fresh aziridine was added, and after 8 hours an additional 8 parts was added. The mixture turned a dark brown and upon distillation yielded 41 parts of 3-(1aziridinyl)-2-methylpropionitrile, a colorless water soluble liquid, b.p. 68°–70° C./11 mm. Anal. calcd. for $C_6H_{10}N_2$: C, 65.41; H, 9.15; N, 25.43. Found: C, 65.30; H, 9.21; N, 25.44.

EXAMPLE 5

The polymerization of the compounds of examples 1, 2, 3, and 4 was carried out in the same manner as described in the following typical procedure:

To 3-(1-aziridinyl)-2-methylpropionitrile (2.4 parts) in a beaker was added with stirring 19 parts of 1 percent aqueous zinc fluoborate. The solution turned milky almost immediately and a viscous polymer began to separate within a few minutes. A white solid also separated with viscous product. The viscous portion was soluble in acetone. The solid portion was a white powder, m.p. 268°–69° C. (dec.,), and insoluble in acetone. Anal. found: C, 60.40; H, 8.82; N, 22.96 (based on polymer mixture).

The properties of the other polymers are described in table I.

TABLE I

| Aziridine Adduct of: | Polymer Analysis, % | Properties |
|---|---|---|
| crotononitrile | C, 63.61; H, 9.06; N,24.49 | Brittle solid, soluble in acetone |
| cinnamonitrile | C,74.92; H, 6.85 N,15.57 | Brittle solid soluble in acetone |
| 2-methylene glutaronitrile | C, 62.04; H, 7.31; N,28.80 (based on polymer mixture) | Solid acetone insoluble portion, and a tacky acetone soluble portion |

The polymerization of the above compounds was also carried out in a similar manner with hydrochloric acid, acetic acid, fluoboric acid, zinc nitrate, zinc chloride, zinc sulfate, zinc acetate, or magnesium chloride. Ethanol or benzene may be used as solvents for the polymerization instead of water.

EXAMPLE 6

The following example is typical of the treatment of cotton fabric:

A piece of cotton printcloth was impregnated with 1 percent aqueous $Zn(BF_4)_2$ and the excess squeezed out by passing through pad rolls. The fabric was dried to remove moisture and then impregnated with a 5 percent aqueous solution of 2-(1-aziridinylmethyl) glutaronitrile, the excess squeezed out and the fabric again dried. The fabric was then rinsed thoroughly. The polymer weight gain on the fabric was 4.6 percent. The fabric dyed a darker shade than a control fabric with an acid dye, and had a flex abrasion resistance (Stoll method) of 813 cycles. This was an improvement over the untreated control fabric, which had a flex abrasion of only 270 cycles.

EXAMPLE 7

A piece of cotton printcloth was treated by exactly the same procedure as in example 6 except a 20 percent aqueous solution of 3-(1-aziridinyl)propionitrile (prepared by reacting acrylonitrile with aziridine) was used. The polymer weight gain on the fabric was 15.8 percent. The flex abrasion resistance was 1,125 cycles compared to a control fabric at 270 cycles. The sample dyed a darker shade than a control fabric with an acid dye.

EXAMPLE 8

A piece of cotton printcloth was treated by exactly the same procedure as in example 6 except a 20 percent aqueous solution of 3-(1-aziridinyl)butyronitrile was used. The polymer weight gain on the fabric was 14.4 percent. The flex abrasion was 323 cycles compared to a control sample at 270 cycles. The fabric had improved dyeability with an acid dye.

EXAMPLE 9

A piece of cotton printcloth was treated by the same procedure in example 6 except 2 percent aqueous $Zn(BF_4)_2$ was used as a catalyst and a 15 percent aqueous emulsion of 3-(1-aziridinyl)-3-phenylpropionitrile was used. The emulsion contained 1 percent dodecyl sodium sulfate as an emulsifying agent. The polymer weight gain on the fabric was 11.3 percent. The fabric had improved dyeability with an acid dye.

We claim:

1. A process for treating cellulosic fabrics to render them more susceptible to acid dyes which process comprises:
   a. padding onto a cellulosic fabric an acid catalyst selected from a group consisting of hydrochloric acid, sulfuric acid, fluoboric acid, acetic acid, zinc fluoborate, zinc nitrate, zinc chloride, zinc sulfate, zinc acetate, and magnesium chloride,
   b. squeezing the fabric free of excess catalyst,
   c. drying the fabric,
   d. impregnating on the fabric an aziridine adduct selected from a group consisting of 3-(1-aziridinyl)butyro-nitrile, 2-(1-aziridinylmethyl)glutaronitrile, 3-(1-aziridinyl)-3-phenylpropionitrile, and 3-(1-aziridinyl)-2-methylpropionitrile,
   e. drying the impregnated fabric,
   f. washing the fabric free of excess reagents.

* * * * *